United States Patent [19]
Tsuboyama et al.

[11] Patent Number: 5,963,190
[45] Date of Patent: Oct. 5, 1999

[54] DRIVING METHOD FOR DISPLAY DEVICE AND DISPLAY APPARATUS

[75] Inventors: Akira Tsuboyama; Kazunori Katakura, both of Atsugi; Manabu Iwasaki, Yokohama, all of Japan

[73] Assignee: Canon Kabushiki Kaisha, Tokyo, Japan

[21] Appl. No.: 08/877,891

[22] Filed: Jun. 18, 1997

Related U.S. Application Data

[63] Continuation of application No. 08/534,044, Sep. 26, 1995, abandoned.

[30] Foreign Application Priority Data

Sep. 26, 1994 [JP] Japan .................................. 6-257593

[51] Int. Cl.$^6$ .................................................. G09G 3/36
[52] U.S. Cl. ........................................ 345/103; 345/89
[58] Field of Search ................................. 345/88, 89, 93, 345/100, 103, 147, 149, 152; 349/85, 96, 144, 172; 348/256

[56] References Cited

U.S. PATENT DOCUMENTS

| | | | |
|---|---|---|---|
| 4,652,912 | 3/1987 | Masubuchi | 358/59 |
| 4,674,839 | 6/1987 | Tsuboyama et al. | 350/334 |
| 4,709,995 | 12/1987 | Kuribayashi et al. | 350/350 |
| 4,712,877 | 12/1987 | Okada et al. | 350/350 |
| 4,776,676 | 10/1988 | Inoue et al. | 350/350 |
| 4,796,890 | 1/1989 | Snyder | 273/144 |
| 4,824,218 | 4/1989 | Kuno et al. | 350/350 |
| 4,902,107 | 2/1990 | Tsuboyama et al. | 350/350 |
| 5,026,144 | 6/1991 | Taniguchi et al. | 350/350 |
| 5,033,822 | 7/1991 | Ooki et al. | 350/331 |
| 5,041,821 | 8/1991 | Onitsuka et al. | 340/784 |
| 5,058,994 | 10/1991 | Mihara et al. | 359/56 |
| 5,091,723 | 2/1992 | Kanno et al. | 340/784 |
| 5,124,695 | 6/1992 | Green | 340/784 |
| 5,126,865 | 6/1992 | Sarma | 359/59 |
| 5,172,105 | 12/1992 | Katakura et al. | 340/784 |
| 5,233,447 | 8/1993 | Kuribayashi et al. | 359/56 |
| 5,262,082 | 11/1993 | Janulis et al. | 252/299.01 |
| 5,296,870 | 3/1994 | Nicholas | 345/89 |
| 5,298,915 | 3/1994 | Bassetti, Jr. | 345/149 |
| 5,321,419 | 6/1994 | Katakura et al. | 345/97 |
| 5,359,344 | 10/1994 | Inoue et al. | 345/100 |
| 5,400,051 | 3/1995 | Krueger, Jr. | 345/127 |
| 5,404,236 | 4/1995 | Hartmann et al. | 359/54 |
| 5,412,395 | 5/1995 | Maeda et al. | 345/89 |
| 5,435,250 | 7/1995 | Pollock | 102/317 |
| 5,436,747 | 7/1995 | Suzuki | 359/55 |
| 5,469,281 | 11/1995 | Katakura et al. | 359/56 |
| 5,471,229 | 11/1995 | Okada et al. | 345/89 |
| 5,488,387 | 1/1996 | Maeda et al. | 345/89 |
| 5,499,037 | 3/1996 | Nakagawa et al. | 345/89 |
| 5,506,601 | 4/1996 | Mihara et al. | 345/103 |

FOREIGN PATENT DOCUMENTS

| | | |
|---|---|---|
| 0261898 | 3/1988 | European Pat. Off. . |
| 0361981 | 4/1990 | European Pat. Off. . |
| 0453033 | 10/1991 | European Pat. Off. . |
| 0573822 | 12/1993 | European Pat. Off. . |
| 0673012 | 9/1995 | European Pat. Off. . |
| 61-272724 | 12/1986 | Japan .................. G09G 3/36 |
| WO93/22396 | 11/1993 | WIPO . |

*Primary Examiner*—Amare Mengistu
*Attorney, Agent, or Firm*—Fitzpatrick, Cella, Harper & Scinto

[57] ABSTRACT

A display device is constituted by scanning lines arranged to form plural pixels including at least two types of pixels having mutually different areas inclusive of larger pixels and smaller pixels. The display device is driven by a driving method including a vertical scanning period wherein only scanning lines corresponding to the larger pixels are vertically scanned, and a second vertical scanning period wherein only scanning lines corresponding to the smaller pixels are vertically scanned.

24 Claims, 10 Drawing Sheets

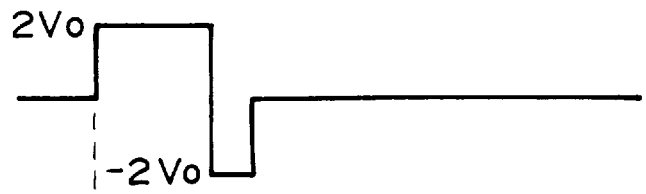
FIG. 5(a) SC1a
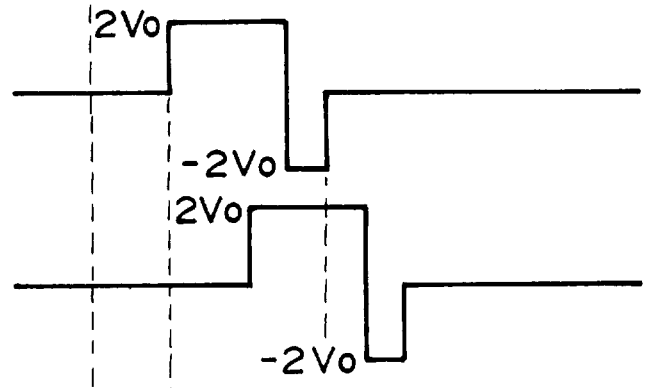
FIG. 5(b) SC2a
FIG. 5(c) SC3a
FIG. 5(d) I

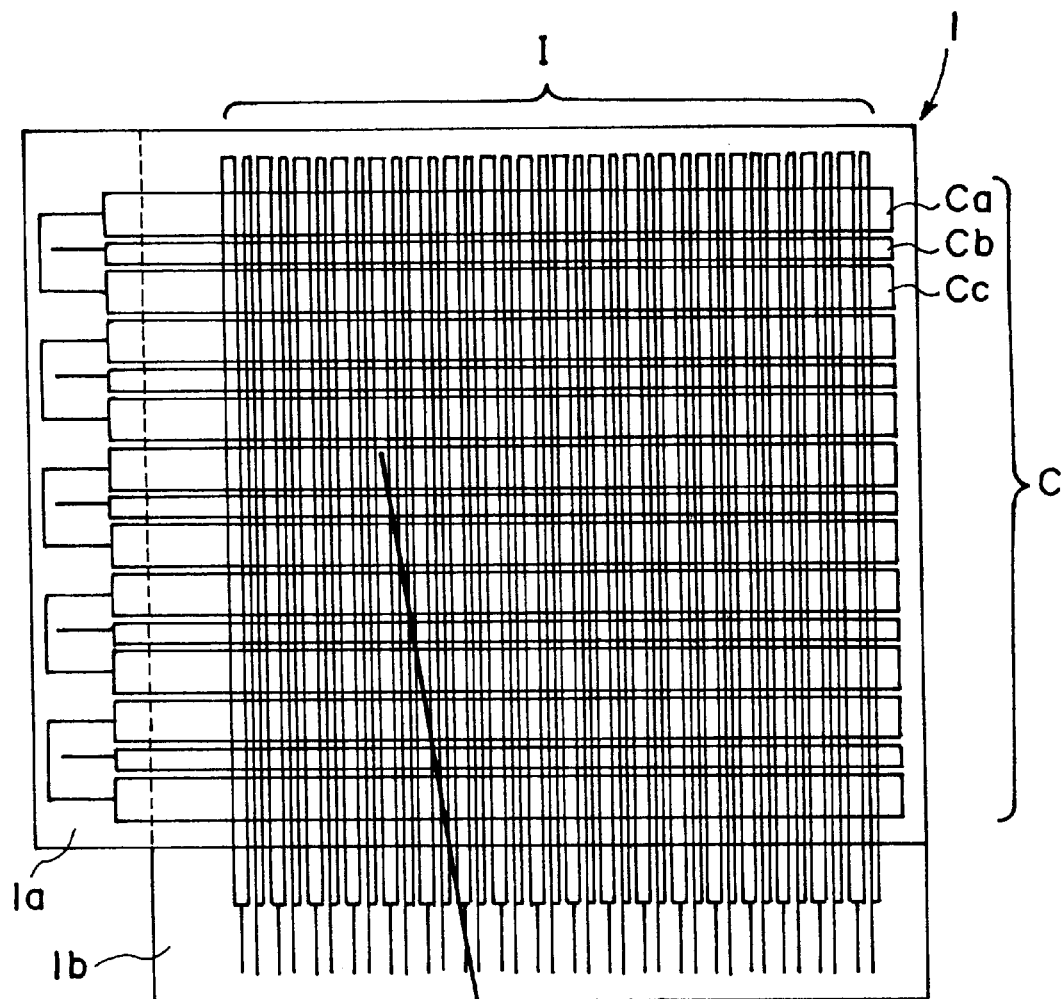
F I G. 8A
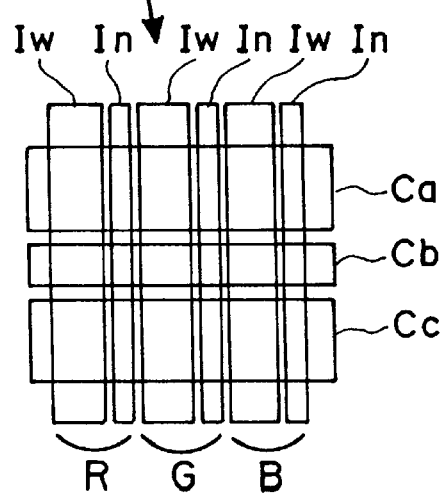
F I G. 8B

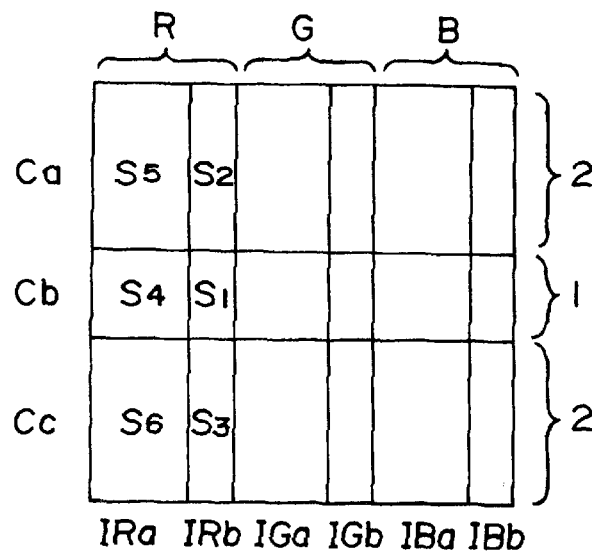
F I G. 9
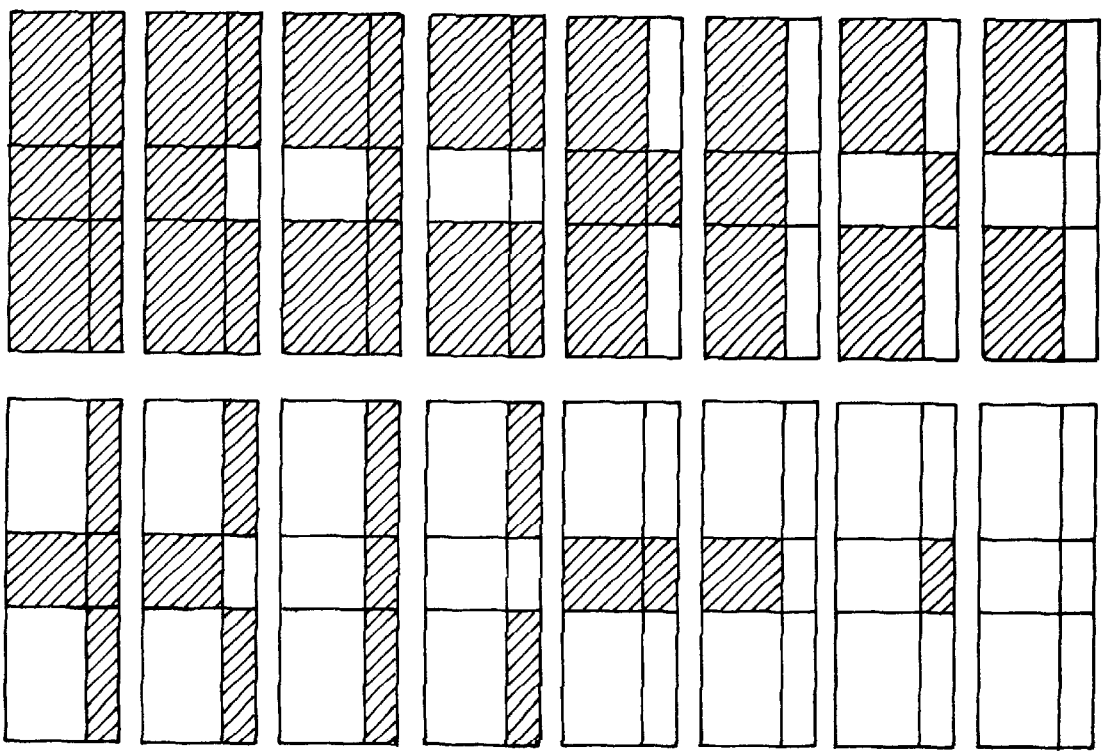
F I G. 10

DRIVING METHOD FOR DISPLAY DEVICE AND DISPLAY APPARATUS

This application is a continuation of application Ser. No. 08/534,044 filed Sep. 26, 1995, now abandoned.

FIELD OF THE INVENTION AND RELATED ART

The present invention relates to a driving method for a display device suitable for use in computer displays, view finders for video camera recorders, television receivers, light valves for video projectors, etc., and a display apparatus including means for such a driving method.

Hitherto, various proposals have been made regarding a method of realizing a multi-level gradation on a liquid crystal display device (LCD) inclusive of the following.

(1) In a first type of method, an applied voltage to respective pixels is controlled according to an applied voltage-transmittance curve to obtain a desired level of luminance at the respective pixels.

This is typically adopted in an active matrix-type LCD using a TN (twisted nematic) liquid crystal. Further, in the case of using a ferroelectric chiral smectic liquid crystal, a method of changing an areal ratio between domains in two orientation states has been proposed, e.g., as disclosed in U.S. Pat. Nos. 4,712,877, 4,796,890, 4,824,218, and 4,776,676.

In the above-described method (1), however, if the applied voltage-transmittance curve is very steep, a large change in luminance occurs in response to a slight fluctuation in applied voltage, so that it is difficult to accurately display a desired level of luminance.

(2) In a second type of method, one frame scanning is divided into plural sub-frames of scanning so as to modulate an ON/OFF time ratio to effect a multi-level gradational display, e.g., as disclosed in U.S. Pat. No. 4,709,995. In the method (2), however, some difficulties can be encountered, such that the circuit becomes complicated and a high-speed scanning is required in order to suppress the occurrence of flicker, thereby posing a large load on the display device and the peripheral circuit therefor.

Other methods include (3) a method using display units (or pixels) each including plural pixels (or sub-pixels) having different areas and turning on the plural pixels (or sub-pixels) in various patterns to display multiple gradation levels, as disclosed in European non-examined application publications EP-A 261898, EP-A 361,981 and EP-A 453,033.

Specific examples of the method (3) and characteristics thereof will be descried with reference to FIGS. 1A–1C and FIG. 2, each intended to display 16 levels of gradational display. Further, in each type, pixel division areal ratios can be varied depending on the intended use of the product display device.

Each of the above-mentioned examples of the display device for the method (3) is characterized by a whole picture area in which at least two types of pixels are present in mixture. From another aspect, it is also possible to regard that each pixel (or display unit) is composed of at least two sub-pixels (or pixels). These are two expressions having substantially the same meaning.

The description hereinafter will be made generally based on the latter expression.

In each of the specific examples shown in FIGS. 1A and 1B, four sub-pixels are used as a unit to constitute a pixel capable of displaying multi-gradation levels. In order to obtain 16 linear optical levels of 0–15, these sub-pixels are set to have areal ratios of 8:4:2:1, and electrodes corresponding to the respective sub-pixels are selectively and sequentially driven depending on given image data.

The examples of FIGS. 1A and 1B are different from each other only in arrangement of the four sub-pixels. More specifically, the sub-pixels shown in the example of FIG. 1A, for example, are formed at intersections of four scanning electrodes and one data electrode while setting the widths of the scanning electrodes in ratios of 8:4:2:1 in order to provide the above-mentioned areal ratios among the sub-pixels. These two types of electrodes may be disposed on a pair of oppositely disposed substrate in a known manner.

Incidentally, linear optical levels may generally be obtained by setting the areal ratios of sub-pixels to satisfy $2^n:2^{n-1}: \ldots : 2^1:2^0$. In this method, an image processing method such as the dither method or the average concentration method may be further used in combination in order to obtain a more natural image.

In the specific example shown in FIG. 1C, 9 sub-pixels having areal ratios as shown are used as a unit (a pixel), and electrodes corresponding to the sub-pixels having different areas are driven selectively and sequentially depending on given image data. As a result, as shown in FIG. 2, White display sub-pixels are disposed symmetrically vertically and horizontally. Accordingly, in the case of this sub-pixel arrangement pattern, a center of ON region (white display portion) is always at the center of the pixel (including 9 sub-pixels) at any gradation level. As a result, it is possible to obviate an image quality deterioration of so-called "false contour" caused when an optical gravitation center is shifted remarkably depending on a gradation pattern.

These display devices having (sub-)pixel arrangement patterns as described above have been conventionally driven in a multiplex manner wherein the scanning lines are selected one by one vertically sequentially from the top to the bottom of an entire picture area.

In such a conventional method of driving a display device including pixels each divided into plural sub-pixels wherein divisional scanning electrodes corresponding to the respective sub-pixels are scanned selectively and sequentially to effect a multi-level gradational display, one frame scanning period for drawing one picture is prolonged because of an increased number of scanning lines due to division of the scanning electrodes, thereby being liable to result in inferior image qualities, such as occurrence of flicker or failure to follow a motion picture display speed.

Further, in such a conventional driving method, similar problems are liable to be caused, also in the case of effecting a partial rewrite by a vertical scanning with preferential drive of scanning electrodes corresponding to an image region where the image data is changed.

SUMMARY OF THE INVENTION

In view of the above-mentioned problems, an object of the present invention is to provide a driving method for a display device for multi-level gradational display including pixels each divided into plural sub-pixels having different areas, capable of obviating image quality deterioration due to an increased number of scanning lines, thereby allowing a high-quality image display without decreasing the number of displayable gradation levels.

Another object of the present invention is to provide a display apparatus constituted to drive such a display device according to such a driving method.

According to an aspect of the present invention, there is provided a driving method for a display device of the type including scanning lines arranged to form plural pixels comprising at least two types of pixels having mutually different areas inclusive of larger pixels and smaller pixels, said driving method comprising a first vertical scanning period wherein only scanning lines corresponding to the larger pixels are vertically scanned, and a second vertical scanning period wherein only scanning lines corresponding to the smaller pixels are vertically scanned.

According to a further aspect of the present invention, there is provided a display apparatus comprising a display device of the type described above, and drive means for driving the display device according to the driving method described above.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 5(a)–5(b) and 6 are respectively a time-serial waveform illustrating an example set of drive signals used in the invention.

FIGS. 7A and 8A are respectively a schematic planar illustration of another example display device used in the invention and FIGS. 7B and 8B are partially enlarged views, respectively, thereof.

FIG. 9 is an illustration including a more detailed denotation of sub-pixels contained in a color display unit (three pixels) shown in FIG. 8B.

FIG. 10 is an illustration of lighting patterns of sub-pixels in a pixel corresponding to 16 gradation levels.

DESCRIPTION OF THE PREFERRED EMBODIMENTS

According to a preferred embodiment of the present invention, the above-mentioned plural pixels (sub-pixels) are divided into a plurality of display units (pixels) each comprising another (ordinarily smaller) plurality of sub-pixels so that each pixel (display unit) is composed of plural sub-pixels having different areas, and one frame display is performed in such a manner that groups of scanning electrodes corresponding to scanning electrodes having identical areas in each group are separately and sequentially vertically scanned, i.e., that a first group of scanning electrodes corresponding to sub-pixels having a first areal-size are sequentially vertically scanned, and then a second group of scanning electrodes corresponding to sub-pixels having a second areal size are sequentially vertically scanned.

According to the driving method of the present invention inclusive of the above embodiment, one frame display can be effected without lowering the vertical scanning frequency, thereby obviating the flicker, and it becomes possible to follow a motion picture speed.

Hereinbelow, the present invention will be described in further detail with reference to the drawings.

Figure 3:
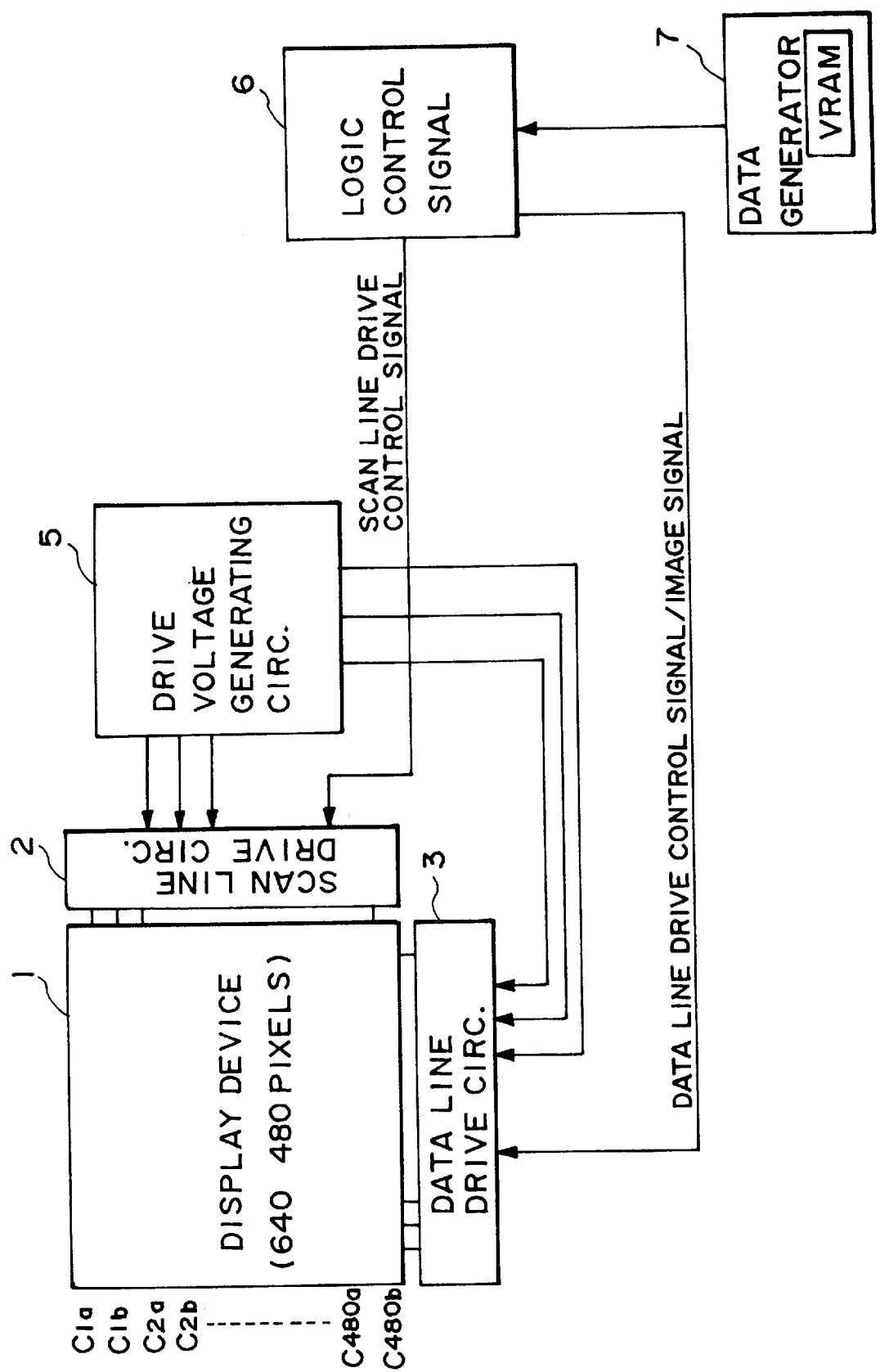
FIG. 3 is a block diagram of a control system used in an embodiment of the display apparatus according to the invention.
Figure 4:
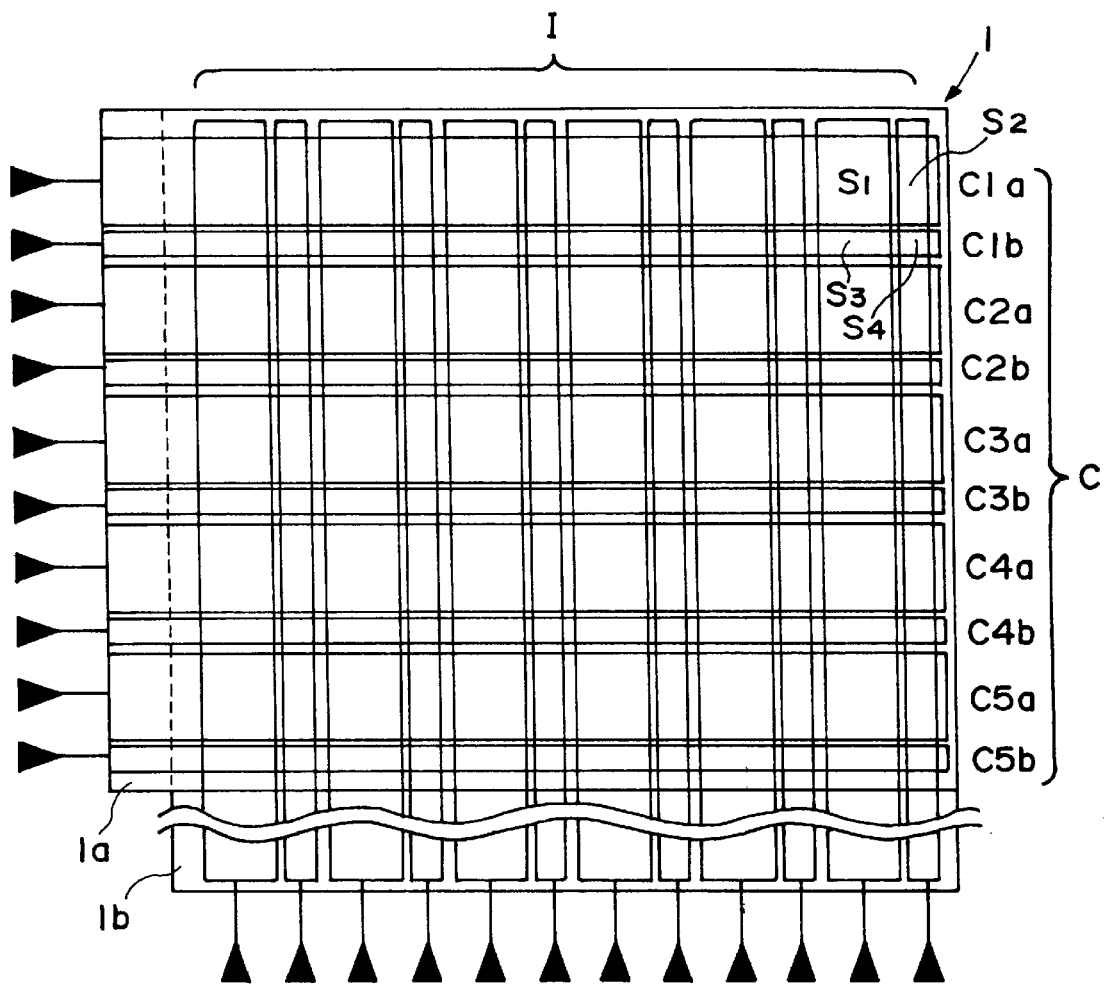
FIG. 4 is a schematic planar illustration of an example display device used in the invention.

FIG. 3 is a block diagram of a drive system for an embodiment of the display apparatus according to the present invention, and FIG. 4 is a schematic plan view for illustrating a part of a liquid crystal display device used in the display apparatus.

Referring to FIGS. 3 and 4, the display apparatus includes a liquid crystal display device 1 comprising a substrate 1a having thereon scanning electrodes C (as scanning lines) and a substrate 1b having thereon data electrodes I (as data lines), and a drive system (i.e., drive means) therefor including a scanning line drive circuit 2 for driving the scanning electrodes C, a data line drive circuit 3 for driving the data electrodes I, a drive voltage generating circuit 5 for supplying drive voltages to the respective drive circuits, a logic control circuit 6 for supplying a scanning line drive control signal to the scanning line drive circuit 2 and supplying a data line control signal and image signals to the data line drive circuit 3, and a data generating unit 7 equipped with a VRAM for supplying image data to the logic control circuit 6.

In this embodiment, the liquid crystal display device 1 actually includes 640×480 pixels (while only 6×5 pixels are shown in FIG. 4), and each pixel is composed of plural sub-pixels having different areas each formed by an intersection of the opposing electrodes on the substrates 1a and 1b.

Figure 1A:
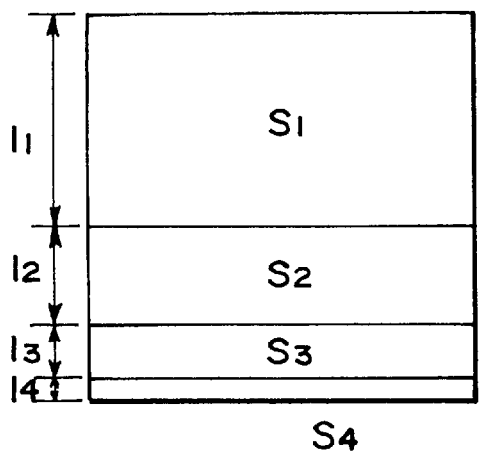
FIGS. 1A–1C respectively show an example of sub-pixel arrangement in a pixel (display unit) for gradational display.
Figure 1B:
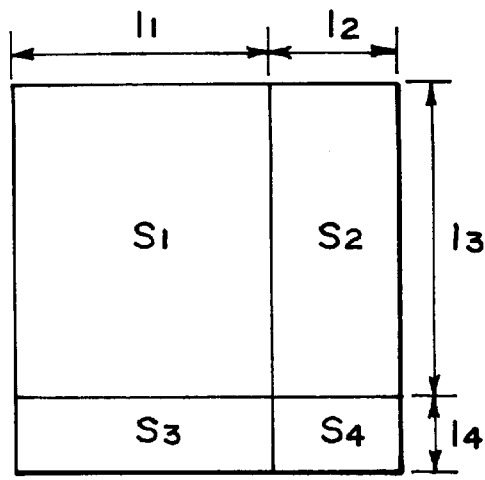

As shown in FIG. 4, in this embodiment, each pixel of the liquid crystal display device 1 is divided into 4 sub-pixels having areal ratios as shown in FIG. 1B. In other words, the scanning electrodes C and data electrodes forming sub-pixels at their intersections are formed in two widths respectively so as to correspond to the four areas of the respective sub-pixels.

For a simpler comprehension, FIG. 4 shows a simpler arrangement composed of 6×5 pixels. In this arrangement, the data electrode and scanning electrode constituting each pixel are each divided into two electrodes, so that totally 10 scanning lines are formed so as to receive a scanning signal, and one line scanning period is designed to be 70 μsec.

In case where a motion picture display as in television is performed according to a conventional driving method of completing a display for each pixel by an a-b line scanning wherein scanning is performed in the order of C1a→C1b→C2a→C2b→C3a→C3b→C4a→C4b→C5a→C5b→C480a the frame frequency becomes ca. 15 Hz which is almost a half of 30 Hz that is a frame frequency required to avoid a flicker, so that an observable flicker is caused. Further, because of a low displaying (or drawing) speed of only 15 Hz, image data supplied at a frequency of 30 Hz is thinned, thus failing to provide a normal motion picture.

In contrast thereto, in a preferred embodiment of the driving method according to the present invention, one frame display is performed in such a manner that groups of scanning electrodes corresponding to scanning electrodes having identical areas in each group are separately and sequentially vertically scanned, i.e., that a first group of scanning electrodes corresponding to sub-pixels having a first areal-size are sequentially vertically scanned, and then a second group of scanning electrodes corresponding to sub-pixels having a second areal size are sequentially vertically scanned. More specifically, in this embodiment, the scanning electrodes C are divided into two groups of a lines and b lines, which are alternately subjected to vertical scanning. The order of scanning may be as follows:

a line scanning: C1a→C2a→C3a→C4a→C5a→... C480a, b line scanning: C1b→C2b→C3b→C4b→C5b→... C480b.

In this case, the a line scanning may be followed by the b line scanning so as to effect one frame display by two vertical scannings. Accordingly, the vertical scanning frequency is retained at 30 Hz without lowering, thereby obviating flicker.

As for an observability of a motion picture display, as the a lines corresponding to the sub-pixels of the largest area having the largest contribution to the luminance can be preferentially scanned at a frequency of 30 Hz, a disruption or deviation of display between frames can be obviated, thereby providing a relatively smooth motion picture display and an effectively higher displaying speed.

In effecting a display on the entire picture area, a first vertical scanning is first performed, wherein among all the scanning lines corresponding to the entire picture area, the scanning lines C1a, C2a, C3a, ... C480a corresponding to the sub-pixel S1 having the largest area and sub-pixels S2 having the second largest area are sequentially supplied with a scanning selection signal and, in synchronism therewith, display signals for determining display states are applied to data lines corresponding to the sub-pixels S1 and S2.

In order to increase the luminance of the picture even if the number of gradation levels is decreased, it is possible to apply to data lines corresponding to the sub-pixels S2 data signals identical to those applied to the data lines corresponding to the sub-pixels S1. As a result, the sub-pixels S2 are caused to have identical display states (identical orientation states of the liquid crystal) as the sub-pixels S1.

Further, in case where the flicker is desired to be suppressed more completely, it may be appropriate to scan the scanning lines corresponding to the scanning lines corresponding to the sub-pixels S1 and S2 by two vertical scannings. In this instance, the scanning lines C1a, C3a, C5a, ... C477a and C479a are sequentially scanned in a first sub-vertical scanning while skipping the remaining scanning lines. In a second sub-vertical scanning, the scanning lines C2a, C4a, ... C478a and C480a are sequentially scanned in a second vertical scanning while skipping the remaining scanning lines.

It is of course possible to effect three vertical scannings so as to first sequentially scan C1a, C4a, ... C478a; then sequentially scan C2a, C5a, ... C479a; and finally sequentially scan C3a, C6a, ... C480a, thereby further increasing the frequency of vertical scanning.

Then, a second vertical scanning of sequentially applying a scanning selection signal to narrow scanning lines C1b, C2b, C3b, ..., C480b in the apparatus shown in FIGS. 3 and 4 may be performed similarly. In the second vertical scanning similarly as the above first vertical scanning, it is possible to apply identical data signals to the sub-pixels S3 and S4 so a to increase the luminance at the cost of decreasing the number of gradation levels, or apply different data signals so as to effect a multi-level gradational display.

It is also possible to divide the second vertical scanning into two or more sub-vertical scannings so as to suppress the flicker similarly as in the first vertical scanning.

The present invention is also effective in the case of rewriting the display states of only pixels in a partial region corresponding to, e.g., the scanning lines C101a–C200b among the total picture area. Such a partial rewrite of display state is effective, e.g., in case of setting a window in a picture for performing a certain task of a computer and displaying a video motion picture in the window. In addition to such a video motion picture display, it is also effective in turning on/off or movement of a cursor or in window scrawling.

In the case of a motion picture display on the entire picture area, it is appropriate to repeat the above-mentioned vertical scanning with skipping of scanning lines.

On the other hand, in the case of displaying a motion picture in a partial region in the entire picture area, it may be also appropriate to vertically scan all the scanning lines corresponding to the larger sub-pixels in the partial region without skipping.

In the case of a display device using an optical modulation material such as a chiral smectic liquid crystal, it is appropriate to effect a refresh scanning of repeating a vertical scanning in a prescribed period even when the image is not rewritten in order to prevent the sticking of the optical modulation material. In this case, the pixels on a selected scanning line are once reset into a bright or dark state and then rewritten into the original display states. As a result, it is possible to prevent the optical modulation substance from being mono-stabilized into one optical state.

The above is the basic scanning scheme according to the present invention, which may be referred to as a first display mode.

In the case of selecting a second display mode using a scanning scheme different from the above-mentioned scheme, the scanning lines may be for example selected in the order of C1a, C1b, C2a, C2b, C3a, C3b, ..., C480a and C480b. If a user is concerned with a flicker, he may select a selection sequence of C1a, C1b, C3a, C3b, C5a, C5b, ..., C479a, C479b, C2a, C2b, C4a, C4b, C6a, C6b, ..., C480a and C480b. In other words, two scanning lines for four sub-pixels S1, S2, S3 and S4 are regarded as a bundle, and the scanning line bundles may be selected sequentially with skipping of one or more bundles apart.

As described above, an embodiment of the display apparatus according to the present invention may include at least two display modes including one adopting the above-mentioned scanning scheme according to the first display mode of the present invention.

Hereinabove, the scanning scheme according to the first display mode of the present invention and another display mode (second display mode) have been described. These display modes may appropriately be selected by manipulating a display mode selection switch by a user himself. The switch may be a mechanical one or an electrical one, or may be manipulated by a software.

It is also possible to design a system so as to select any of the display modes automatically depending on the kinds of image data to be displayed. Such a display mode selection may be effected by adding a changeover circuit including a memory storing a software execution program and a controller. For example, it may be appropriate to select a mode in the case of partial rewrite in such a manner that the second display mode is selected when the number of rewritten scanning lines is smaller than a prescribed number, and the first display mode is selected when the number of rewritten scanning lines is larger than the prescribed number similarly as all the scanning lines are scanned.

Further, it is also possible to effect a refresh scanning and a partial rewrite scanning in combination. For example, among the 480 scanning lines, pixels on 200 scanning lines of from 201th lines to 400th lines are rewritten, and pixels on 1st to 200th and 401th to 480th scanning lines are not rewritten but refresh-scanned. In this instance, in the first vertical scanning period, the 1st to 200th scanning lines may be scanned so as to select every 8th scanning line, e.g., 8th, 16th, 24th, . . . 200th scanning lines corresponding to the larger pixels, then all the 201th to 400th scanning lines may be selected, and then the 401th–480th scanning lines may be scanned so as to select every 8th scanning line, respectively for driving the a lines on the selected scanning lines corresponding to the larger pixels.

Then, in the second vertical scanning period, the scanning lines may be sequentially selected similarly in the order of 8th, 16th, 24th, . . . 200th, 201th, 202nd, 203th, . . . , 399th, 400th, 408th, 416th, . . . , 472nd and 480th scanning lines but for driving the b lines corresponding to the smaller pixels.

In this way, the pixels on the two types of scanning lines (a lines and b lines) are rewritten, and the pixels on the a lines and b lines on the 8th, 16th, 24th, . . . , 200th and 408th, . . . , 480th scanning lines are refresh-scanned to retain the previous display states.

Then, in a subsequent frame, the 1st, 9th, 17th, . . . , 25th, . . . , 201st, 202nd, . . . , 399th, 400th, 401st, 409th, . . . , 473rd scanning lines are selected to drive the a lines thereon corresponding to the large pixels in the first vertical scanning period, and then selected in the same order to drive the b lines thereon corresponding to the smaller pixels in the second vertical scanning period.

By continuing the above-described sequential scanning for 8 frames, the partial rewrite region is rewritten at a large multiplicity of gradation levels and the other regions for no writing are refreshed to avoid sticking.

As another mode of scanning, the pixels on the a lines and b lines on 201th to 400th scanning lines as shown in FIGS. 3 and 4 may be partially rewritten by a sequential selection in the order of scanning lines C8$a$, C8$b$, . . . C200$a$, C200$b$, C201$a$, C202$a$, C203$a$, . . . C399$a$, C400$a$, C408$a$, C408$b$, C416$a$, C416$b$, . . . C480$a$ and C480$b$ (first period); then in the order of C1$a$, C1$b$, C9$a$, C9$b$, . . . , C201$b$, C202$b$, C203$b$, . . . C399B, C400$b$, C401$a$, C401$b$, C409$a$, C409$b$, . . . C473$a$ and C473$b$ (second period); . . .

In this way, in the region including the scanning lines from C1$a$, C1$b$, C200$a$, C200$b$, the scanning line bundles of a lines and b lines corresponding to the larger and smaller pixels, respectively, are selected with skipping of 7 bundles apart (every 8th bundle). In the partial rewrite region, only the a lines corresponding to the larger pixels are first sequentially selected and then only the b lines corresponding to the smaller pixels are rewritten sequentially, to effect a partial rewrite. In the region including the scanning lines, C401$a$, C401$b$, . . . , C480$a$ and C480$b$, the same scanning as in the region of the scanning lines C1$a$, C1$b$, . . . , C200$a$, C200$b$ is performed.

As a result, all the scanning lines are accessed in totally 8 periods, so that the scanning lines in the partial rewrite region are scanned at a higher frequency than in the other region (non-rewrite region). As a result, the image sticking in the non-rewritten region is prevented while rewriting the multi-gradation level display at a high speed.

Of course, if the number of skipping of the scanning lines in the non-rewrite region is increased, it is possible to further accelerate the rewriting speed.

A basic concept of partial rewrite is disclosed in U.S. Pat. No. 5,091,723, and a basic concept of multiple-interlaced scanning is disclosed in U.S. Pat. No. 5,058,994.

The above-described display operation may be performed by connecting a display device to a scanning line drive circuit and a data line drive circuit, and to a control circuit, and supplying scanning line address data and display data to the scanning line drive circuit and the data line drive circuit as disclosed in, e.g., U.S. Pat. Nos. 5,091,723, 5,058,994, 5,435,250 and 5,359,344. These circuits are generally composed of a large number of IC chips. The scanning line drive circuit having therein an address decoder functions to decode scanning line address data, apply a scanning selection signal to a selected scanning line and apply a scanning non-selection signal to the remaining scanning lines.

Examples of the display device used in the present invention may include those using a liquid crystal or an electrochromic material as an optical modulation material, a DMD device using micro-mirrors, a plasma device, and an electron-emission device.

The scanning lines referred to herein may be scanning electrodes of simple-matrix or active matrix devices, and may also refer to scanning traces with light beam or plasma in the case of a photo-address device using a photoconductor film or a plasma device similarly as in a CRT. In the case of a photo-address type device comprising a photoconductor film, the pixels may be regarded as being integrated without data lines.

Accordingly, the scanning selection signal used in the present invention may be composed of a photo-signal or an electric signal adapted to a display device used.

Hereinbelow, a non-active matrix-type liquid crystal display device will be described as an example of the display device used in the present invention.

A liquid crystal device used in the present invention may be formed as a liquid crystal cell or panel comprising a pair of oppositely disposed substrates each having thereon a plurality of electrodes constituting scanning lines or data lines and an alignment thereon, and a liquid crystal material disposed therebetween by injection.

The substrates constituting such a liquid crystal device may be composed of semiconductor, glass, quartz or plastic, and at least one thereof may desirably be transparent.

Further, at least one of opposing electrodes constituting each pixel may preferably comprise a transparent conductor, suitable examples of which may include: tin oxide, indium oxide and indium-tin-oxide (ITO). Further, according to necessity, each stripe of transparent electrode may be accompanied with a narrower strip of low-resistivity metal. The electrodes may preferably have a thickness of ca. 40–200 nm.

The alignment film for controlling alignment of liquid crystal molecules may comprise a film of an organic material, such as polyimide, polypyrrole, polyvinyl alcohol, polyamideimide, polyesterimide, polyparaxylylene, polyester, polycarbonate, polyvinyl acetal, polyvinyl chloride, polyamide, polystyrene, cellulosic resin, acrylic resin, or melamine resin; or an inorganic film, such as an obliquely vapor-deposited film of SiO. The thickness may desirably be ca. 5–100 nm.

The alignment film may preferably be subjected to rubbing in order to provide a desired range of pretilt angle to liquid crystal molecules at the boundary.

(Preparation of liquid crystal cell)

A liquid crystal cell (or panel) may be prepared in the following manner. A transparent substrate of, e.g., glass is coated with a transparent conductor film by a vapor deposition process, such as CVD, sputtering or ion plating, and the conductor film is patterned into stripes, which are then coated with an insulating film by a vapor deposition process as described above or wet-application, and then with a solution containing fine particles dispersed therein applied by printing, followed by pre-baking and curing to form a roughened surface. An alignment film is further formed thereon by spinner coating of, e.g., a polyamide acid solution, followed by baking. The film is then subjected to rubbing. A pair of substrates may be respectively treated in the above-described manner. On one of the pair of substrates, spacer beads may be dispersed, and a sealant is applied on the periphery thereof, and the other substrate is applied thereto to form a blank cell. Then, a liquid crystal material is injected into the blank cell through an injection port thereof and, after sealing the injection port, is gradually cooled into a desired operating phase, such as chiral smectic phase.

An example of the liquid crystal device capable of enjoying the most noticeable effect according to the present invention may be a non-active matrix-type device using chiral smectic liquid crystal. The chiral smectic liquid crystal device may be classified into two types according to a smectic layer structure contained therein, i.e., one containing a chevron layer structure and the other containing a bookshelf structure. The latter type may be preferred because of a higher transmittance.

A preferred example of the liquid crystal material used may be a liquid crystal composition containing a fluorine-containing mesomorphic compound (perfluoroether mesomorphic compound) containing a fluorocarbon terminal portion and a hydrocarbon terminal portion connected with a central core, having a smectic intermediate phase or potential smectic intermediate phase, and containing an ether-type oxygen in the fluorocarbon terminal chain (described in U.S. Pat. No. 5,262,082 and PCT International Patent WO 93/22396, and reported by Marc D. Radcliff, et al in 1993 Fourth International Ferroelectric Liquid Crystal International Conference P-46).

Such a liquid crystal material may be characterized by a phase transition series lacking cholesteric phase on temperature decrease, i.e., causing a phase conversion from isotropic phase into smectic A phase without mediating cholesteric phase in the course of temperature decrease.

In case of using such a liquid crystal material, it is also preferred to use a pair of substrates, only one of which is provided with an alignment film having a strong alignment control force as represented by a rubbed polyimide film. The other substrate may be free from an alignment film or an alignment film having only a weak alignment control force, inclusive of a rubbed film.

In case of using a pair of substrates each having a rubbed alignment films, the rubbing directions may preferably intersect at an angle of 1–10 degrees.

A liquid crystal cell (or panel) prepared in the above-described manner may be sandwiched between a pair of polarizers disposed in cross nicols to provide a liquid crystal device capable of providing a bright and a dark state depending on the orientation states of the liquid crystal molecules.

Now, an example set of scanning signal and data signals will be described with reference to the case of driving a chiral smectic liquid crystal device.

FIGS. 5(a)–5(b) show scanning signals and data signals. More specifically, at SC1a, SC2a and SC3a is shown a scanning signal sequentially applied to scanning lines SC1a, SC2a and SC3a, and at I are shown data signals successively applied to a data line I. A scanning selection signal comprises a pulse with a voltage $2V_0$ for a reset pulse for resetting the pixels on a scanning line and a writing pulse with a voltage $-2V_0$ for writing in pixels. A reference voltage of zero volt (which may be called a scanning non-selection signal) is applied to non-selected scanning lines.

Figure 6:
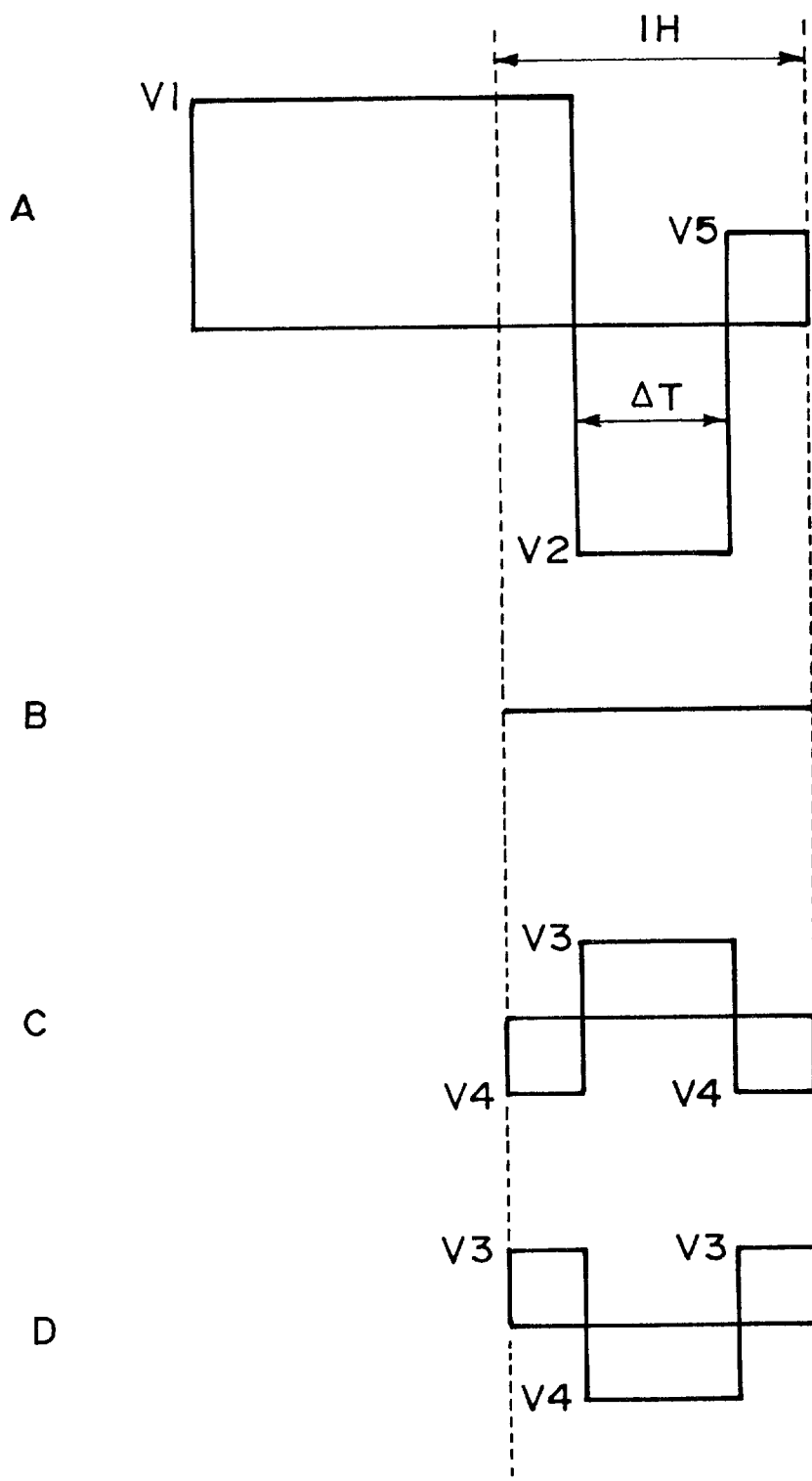

FIG. 6 shows another example set of a scanning signal and data signals. At A is shown a scanning selection signal comprising a reset pulse V1 for resetting into a dark state, a writing pulse V2 and an auxiliary pulse V5. At B is shown a scanning non-selection signal. At C is shown a data signal for displaying a "bright" state having a DC component of zero. At D is shown a data signal for displaying a "dark" state having a DC component of zero.

Next, another pixel arrangement used in a display device of the present invention will be described.

Figure 7A:
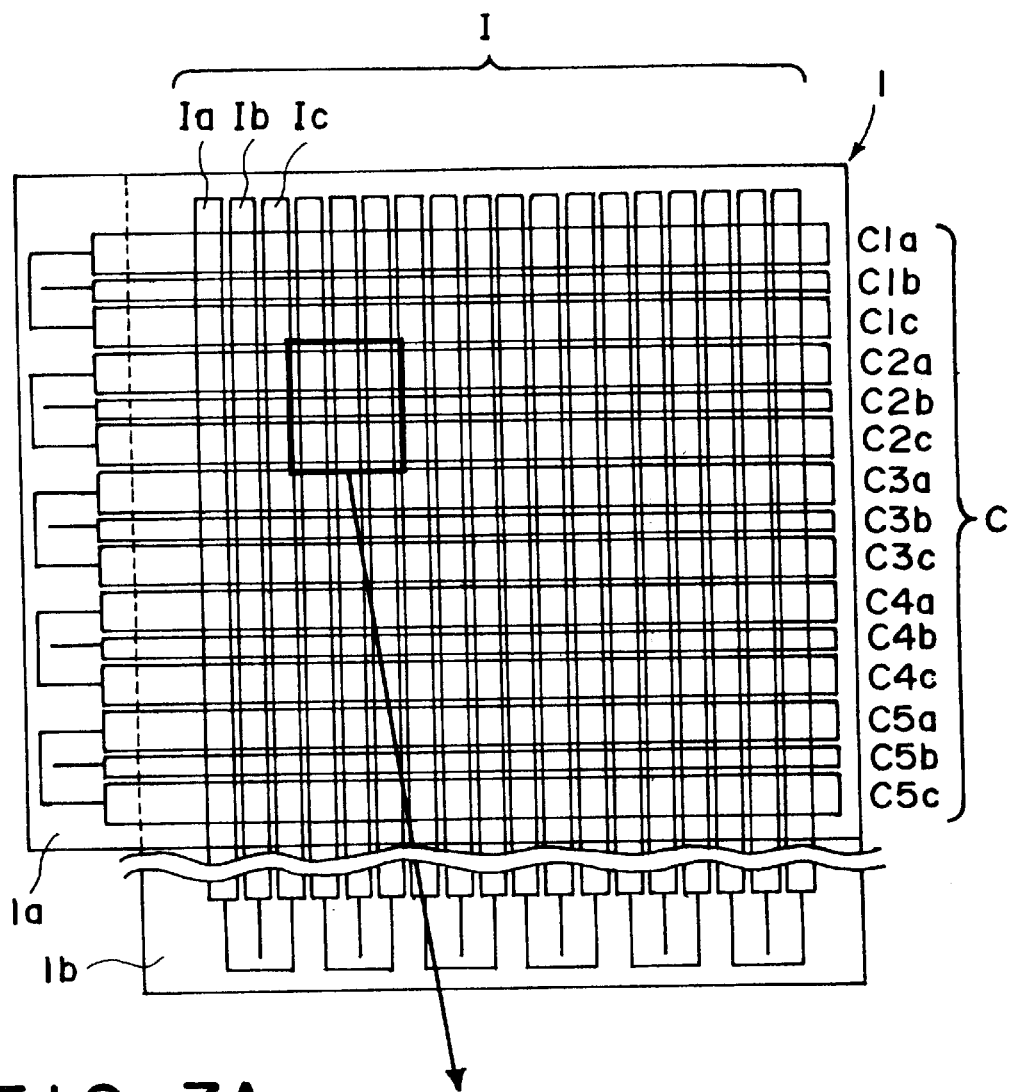
Figure 7B:
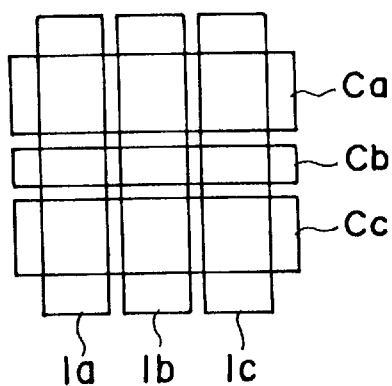

FIG. 7A is a schematic plan view of an electrode arrangement in a liquid crystal display device 1, and FIG. 7B is a partially enlarged view thereof for illustrating a pixel composed of 9 sub-pixels. As is understood from FIG. 7B, the 9 sub-pixels are designed to have different areas so as to maintain a gravity center of light quantity transmitted through each pixel always at the enter of the pixel regardless of gradation levels. Further, the scanning electrodes Ca and Cc are electrically short circuited so as to simultaneously receive a scanning signal. Similarly, the data electrodes Ia and Ic are short circuited to simultaneously receive a data signal. The scanning of Cna and Cnc (n is an integer) corresponds to the a line scanning in the embodiment described hereinabove.

FIG. 8A is a schematic plan view of another electrode arrangement in a liquid crystal display device 1, and FIG. 8B is a partially enlarged view thereof for illustrating a color pixel unit composed of 18 sub-pixels.

As shown in FIGS. 8A and 8B, in the liquid crystal display device 1 in this embodiment, each pixel comprises 18 sub-pixels having different areas and is provided with color filter of R, G and B to constitute a color display unit. Each of R, G and B pixels is composed of two data electrodes of Iw and In having different widths and three scanning electrodes similarly as in the above embodiment including Ca and Cc which are electrically short circuited. Accordingly, each color pixel is effectively composed of two scanning lines. As a result, four bit data are displayed for each color, and totally 12 bit color data are displayed for each pixel without causing a false contour.

FIG. 9 illustrates a concept of pixel division and FIG. 10 illustrates 16 gradation levels displayed when the first or second display mode is adopted, respectively according to this embodiment.

Further, in the pixel arrangement shown in FIGS. 8 and 9, a thin data line IBb for a blue pixel (B) can be omitted so as to display four gradation levels since a difference in gradation level cannot be readily recognized with respect to blue (B).

In this way, sub-pixels (S5 and S6) having the largest area in combination are disposed vertically in separation, and sub-pixels (S2 and S3) having a medium size are disposed on the same scanning lines as the sub-pixels S5 and S6, respectively. As a result, a gradational display for displaying different numbers of gradation levels can be selectively effected in the first display mode.

The scanning schemes and display device structures inclusive of pixel arrangements described herein may be combined appropriately in designing of display apparatus.

Now, the false contour phenomenon will be described.

Figure 11:
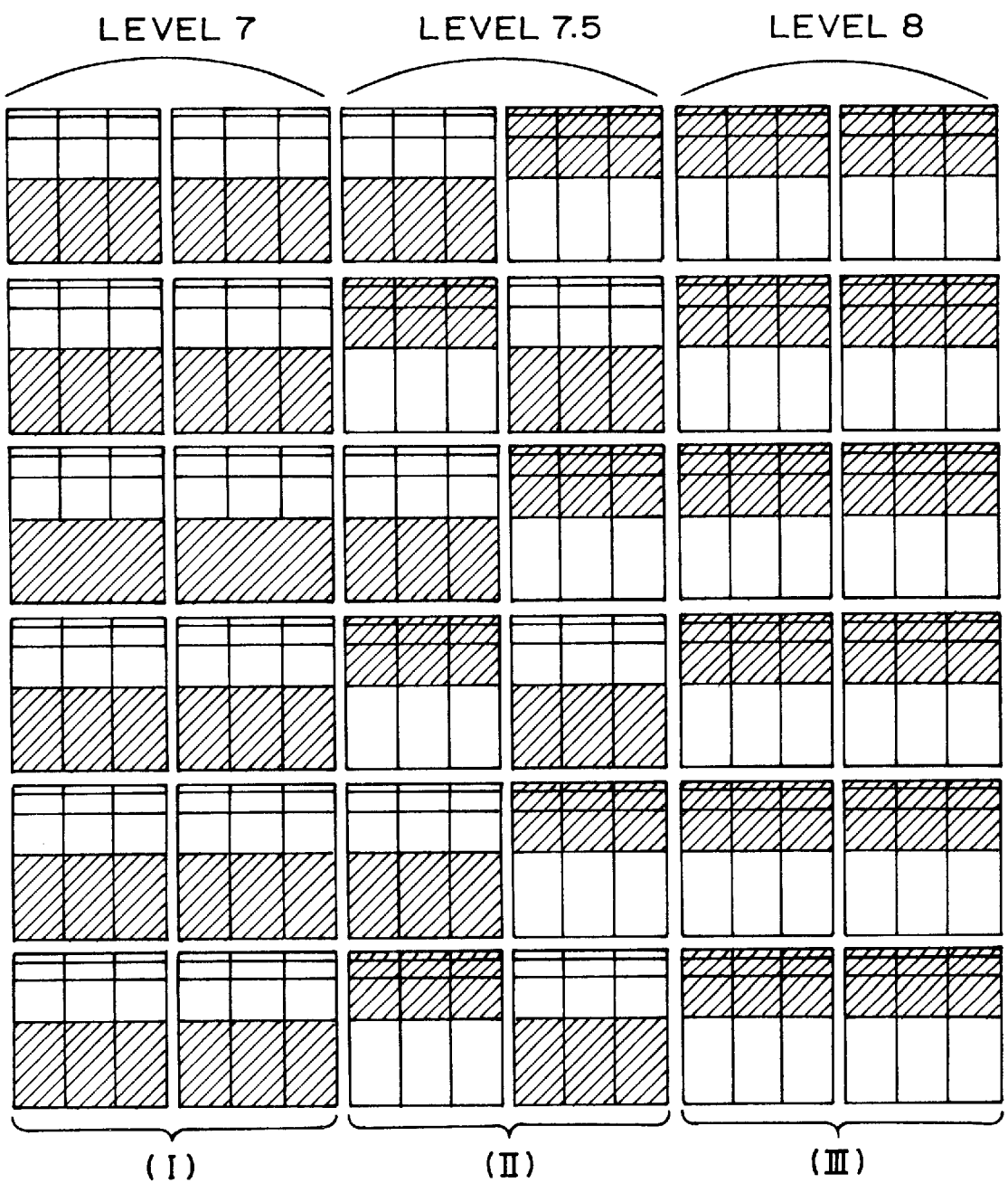
FIG. 11 is a planar illustration of a portion of display device including lighting patterns corresponding to three gradation levels for illustrating occurrence of a false contour.

For example, when pixels shown in FIG. 1A are used to display a gradation at level 7 as shown at (I) in FIG. 11, the upper part of each pixel is displayed in white. In contrast thereto, when a gradation at level 7.5 is displayed, diagonal portions in each pixel are displayed in white as shown at (II) in FIG. 11. Further, when a gradation at level 8 is displayed, a lower-part of each pixel is displayed in white as shown at (III) in FIG. 11 contrary to the case of the gradation level of 7.

As a result, in case where a center of ON region (white display portion) is noted, the center is present at an upper part at level 7, almost at the middle part at level 7.5 and at a lower part at level 8. As a result, when a natural image such as that of a photograph is displayed on the liquid crystal display device and an actual contour of the image has a varying gradation level of from 7 to 8, the center of ON (white) region is shifted by the difference in gradation so that a false contour, i.e., a contour different from the actual one, is displayed to lower the image quality. An ordinary pixel pitch is on the order of several hundred μm, and the above-mentioned shift contour is very clearly noticed even at this level of pixel pitch, thus resulting in a false contour.

In contrast thereto, in the pixel arrangement shown in FIG. 7 or FIG. 8, a large sub-pixel is divided into two sub-pixels disposed symmetrically on both vertical sides of a smaller sub-pixel, so that the movement of gravity center of bright or dark display is suppressed when the gradation level is changed.

Hereinbelow, some specific examples are described.

EXAMPLE 1

Figure 1C:
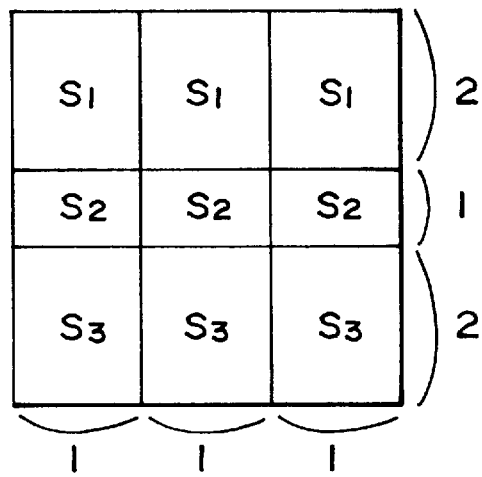
Figure 2:
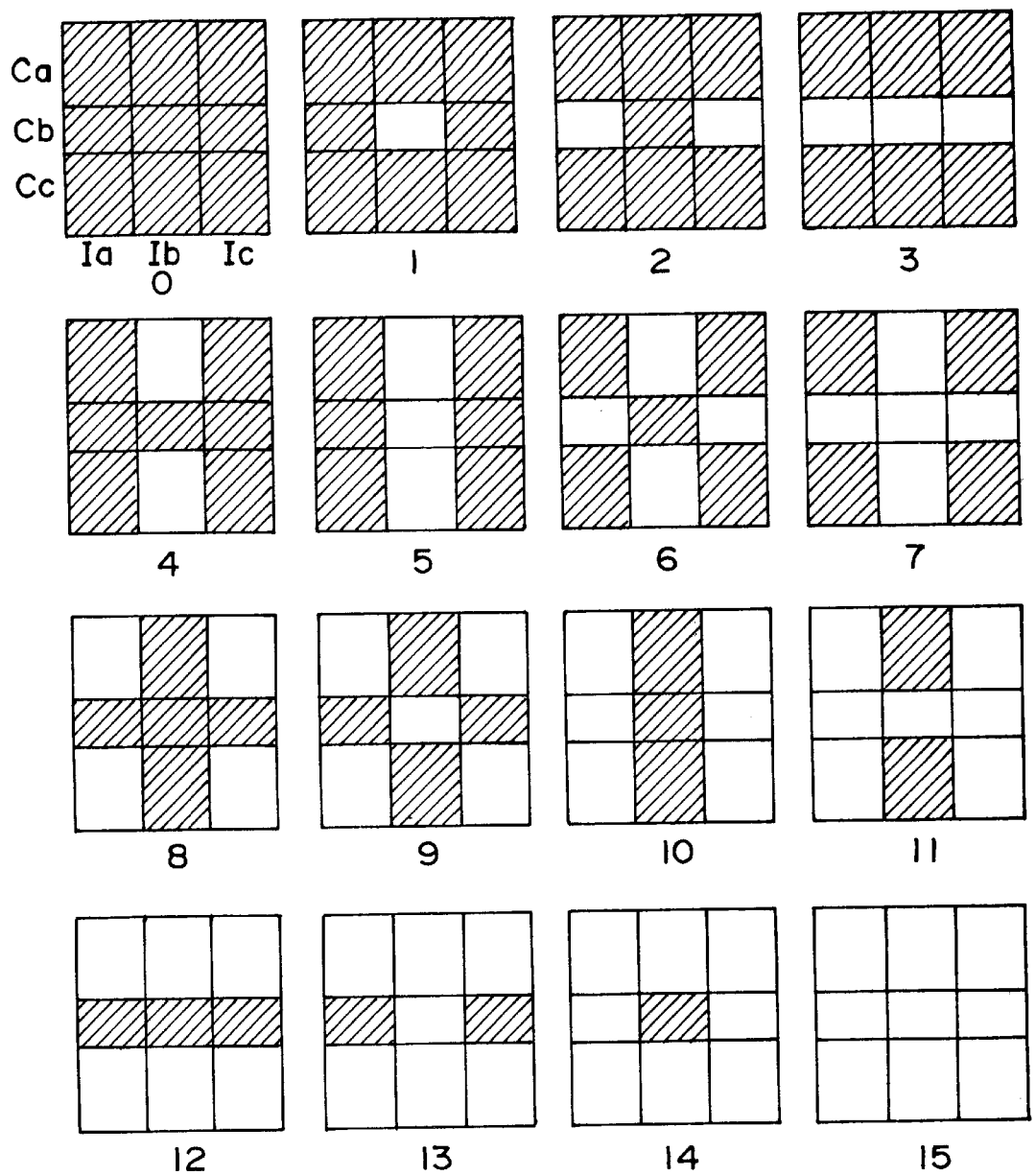
FIG. 2 shows 16 sub-pixel lighting patterns corresponding to 16 gradation levels.

A liquid crystal display device having a pixel arrangement as shown in FIG. 7 and sub-pixel areal ratios as shown in FIG. 1C is driven to effect a gradational display so as to always retain the gravity center of transmitted light quantity at the center of each pixel having the sub-pixels at various gradation levels. For this purpose, the scanning electrodes Sa and Sc are short circuited with each other so as to simultaneously receive a scanning line drive signal, and the data electrodes Ia and Ic are short circuited with each other so as to simultaneously receive a data signal. The scanning of lines Cna and Cnc is called the a line scanning similarly as described hereinbefore.

The drive signals shown in FIG. 6 are used to first effect the a line scanning and then the b line scanning so as to effect one frame display by the present invention. As a result, the vertical scanning is effected at a frequency of 30 Hz to suppress the flicker.

Further, by scanning the a lines having a larger contribution to the luminance at a frequency of 30 Hz continuously in a vertical scanning, it is possible to obviate the disruption or deviation of display between frames, thereby providing a relatively smooth motion picture display and an effectively high display speed.

EXAMPLE 2

A liquid crystal display device having a pixel arrangement as shown in FIGS. 8A and 8B is driven to effect a color gradation display. It has been confirmed that improvements in image quality are attained similarly as in Example 1 by alternately effecting the a line scanning and the b line scanning.

EXAMPLE 3

In the above-described Examples 1–2, it is also possible to effect a partial rewrite drive, wherein scanning electrodes in an image region where image data are changed are preferentially vertically scanned.

In a specific example using a device having the pixel arrangement shown in FIG. 7, a motion picture was displayed in a region comprising 100th scanning lines (C100a and C100b) to 199th scanning lines (C199a and C199b) by preferentially vertically driving the scanning lines. In this instance, the a lines and b lines were alternately scanned vertically whereby the motion picture was displayed more smoothly.

EXAMPLE 4

In the above-described Examples 1–3, it is also possible to effect an interlaced scanning by effecting a vertical scanning while skipping plural scanning lines.

More specifically, the a line scanning and b line scanning may be effected by four vertical scannings in the following order:

1st: 1st a line scanning of C1a–C3a→C5a→C7a→ . . . →C479a,

2nd: 2nd a line scanning of C2a→C4a→C6a→C8a→ . . . →C480a,

3rd: 1st b line scanning of C1b→C3b→C5b→C7b→ . . . →C479b,

4th: 2nd b line scanning of C2b→C4b→C6b→C8b→ . . . →C480b.

As a result, a vertical scanning frequency of 50 Hz is possible, thereby avoiding flicker to obtain a high-quality image.

In the above, it is also possible to replace the 2nd a line scanning and the 1st b line scanning with each other so that the 1st b line scanning is inserted between the first and second a line scannings.

EXAMPLE 5

A display device having a pixel arrangement as shown in FIGS. 8A and 8B is used to effect a display.

The display device is first driven according to the second display mode, whereby all the scanning lines are scanned, and all the data lines are supplied with independent data signals to effect a gradational display at 16 levels for each of R, G and B colors.

Then, the display mode is switched by a changeover switch to the first display mode so as to first scan only the a and c scanning lines having a larger width in a first vertical scanning, and then scan only the b scanning lines having smaller widths in a second vertical scanning. In this instance, when a four-level display is desired by the operator, pairing data lines Iw and In for each color pixel R, G or B are supplied with identical data signals. Further, when the user selects an eight gradation level mode, independent data signals corresponding to given gradation levels are applied to pairing data lines for each color pixel.

In the above-described Examples 1–5, it is also possible to effect a partial rewrite drive, wherein scanning electrodes corresponding to sub-pixels having the largest area and in an image region where image data are changed are preferentially vertically scanned.

In a specific example, a motion picture was displayed in a region comprising 100th scanning lines (C100a and C100b) to 199th scanning lines (C199a and C199b) by preferentially driving the scanning lines. In this instance, the a lines were first scanned and then the b lines were scanned, whereby the motion picture was displayed more smoothly.

COMPARATIVE EXAMPLE 1

A conventional full-line scanning (a - b line scanning), i.e., a scanning in the order of C1a→C1b→C2a→C2b→C3a→C3b→C4a→C4b→C5a→C5→ . . . C480a→C480b was performed in any of the liquid crystal display devices shown in FIGS. 4, 7 and 8. (In the devices of FIGS. 7 and 8, C1a for example includes C1a and C1c short circuited with each other.)

As a result, flicker was observed at a frequency of 15 Hz. Further, during the vertical scanning for displaying, image data in VRAM in the data generator 7 was rewritten to cause a disruption of picture during the scanning. Thus, inferior image qualities were confirmed.

As described hereinabove, according to the driving method for a display device, and the display apparatus, of the present invention, the scanning electrodes may be divided without lowering the vertical scanning frequency, thus avoiding occurrence of flicker. Further, by preferentially scanning the scanning electrodes corresponding to sub-pixels having the largest contribution to the luminance when desired, a display operation may be performed without causing disruption or deviation of display between frames, so that a motion picture may be displayed in a higher quality.

What is claimed is:

1. A driving method for a display device of the type comprising a plurality of scanning lines and a plurality of data lines arranged so as to form a matrix of pixels each formed at an intersection of the scanning lines and the data lines, said pixels comprising at least two types of pixels having mutually different areas inclusive of larger pixels and smaller pixels, said plurality of scanning lines including first-type scanning lines having thereon the larger pixels and second-type scanning lines having thereon the smaller pixels, said matrix of pixels being divided into a plurality of display elements each adapted for a gradational display and comprising a plurality of pixels including at least one of the larger pixels and at least one of the smaller pixels, said driving method comprising a first vertical scanning period wherein only the first-type scanning lines are vertically scanned, and a second vertical scanning period wherein only the second-type scanning lines are vertically scanned, wherein each display element is driven by selectively turning on and off the plurality of pixels thereon so as to alleviate a vertical shift of gravity center of brightness at different gradation levels.

2. A driving method according to claim 1, including a partial rewrite period wherein only a part of the scanning lines corresponding to a region including pixels for which image data is changed is scanned, and said partial rewrite period includes said first and second vertical scanning periods.

3. A driving method according to claim 1, including said first and second vertical scanning periods in a period of scanning all the scanning lines.

4. A driving method according to claim 1, wherein said first vertical scanning period includes a period of vertically scanning non-adjacent scanning line while skipping other scanning lines and a sub-period of scanning the skipped scanning lines, and said second vertical scanning period includes a sub-period of vertically scanning non-adjacent scanning lines while skipping other scanning lines and a sub-period of scanning the skipped scanning lines.

5. A driving method according to claim 1, wherein said second vertical scanning period includes plural sub-vertical scanning periods, and said first vertical scanning period includes plural sub-vertical scanning periods, between which one of said sub-vertical scanning periods of the second vertical scanning period is inserted.

6. A driving method according to claim 1, wherein in each of said first and second vertical scannings, vertical scanning is performed while skipping at least one scanning line.

7. A driving method according to claim 1, wherein two of the larger pixels are disposed positionally symmetrically with respect to a smaller pixel disposed between the two larger pixels so as to form one display element.

8. A driving method according to claim 1, wherein at least two adjacent first-type scanning lines among the first-type scanning lines corresponding to the larger pixels are simultaneously supplied with a scanning selection signal.

9. A driving method according to claim 1, wherein the first-type scanning lines are vertically scanned with skipping of at least one first-type scanning line in a prescribed region and without skipping in another region.

10. A driving method according to claim 1, wherein said pixels comprise a chiral smectic liquid crystal.

11. A driving method according to claim 1, wherein said display device comprises a pair of substrates and a chiral smectic liquid crystal disposed in a bookshelf layer structure between the substrates.

12. A driving method according to claim 1, wherein said display device comprises a pair of substrates and a chiral smectic liquid crystal having a phase transition series lacking cholesteric phase disposed between the substrates.

13. A driving method according to claim 1, wherein said display device comprises a pair of substrates and a chiral smectic liquid crystal disposed between the substrates, only one of the substrates having been subjected to rubbing.

14. A driving method according to any one of claims 1–13, wherein each display element comprises a smaller pixel, at least two larger pixels disposed positionally symmetrically with respect to the smaller pixel, and a medium pixel having a smaller area than the larger pixel and disposed on the same scanning line as the larger pixel.

15. A driving method according to claim 1, wherein said plural pixels include color pixels of red, blue and green.

16. A driving method according to claim 1, wherein said plural pixels include color pixels of red, blue and green each adapted for gradational display, one of the red, blue and green color pixels having a number of gradation levels different from those of the other color pixels.

17. A driving method according to claim 1, wherein said first-type scanning lines having thereon said larger pixels also have thereon pixels smaller than said larger pixels.

18. A driving method according to claim 1, wherein each said display element includes pixels having different areas disposed on an identical scanning line which receive identical data signals.

19. A driving method according to claim 1, wherein each said display element includes pixels having different areas disposed on an identical scanning line which receive different data signals.

20. A display apparatus, comprising:
a display device comprising a plurality of scanning lines and a plurality of data lines arranged so as to form a matrix of pixels each formed at an intersection of the scanning lines and the data lines, said pixels comprising at least two types of pixels having mutually different areas inclusive of larger pixels and smaller pixels, said plurality of scanning lines including first-type scanning lines having thereon the larger pixels and second-type scanning lines having thereon the smaller pixels, said matrix of pixels being divided into a plurality of display elements each adapted for a gradational display and comprising a plurality of pixels including at least one of the larger pixels and at least one of the smaller pixels; and drive means for driving the display device according to a driving method of claim 1.

21. A driving method for a display device of the type comprising a plurality of scanning lines and a plurality of data lines arranged so as to form a matrix of pixels each formed at an intersection of the scanning lines and the data lines, said pixels comprising at least two types of pixels having mutually different areas inclusive of larger pixels and smaller pixels, said plurality of scanning lines including first-type scanning lines having thereon the larger pixels and second-type scanning lines having thereon the smaller pixels, said plurality of data lines including first-type data lines and second-type data lines providing pixels of mutually different areas on a common scanning line, said driving method comprising a first vertical scanning period wherein only the first-type scanning lines are vertically scanned, and a second vertical scanning period wherein only the second-type scanning lines are vertically scanned.

22. A driving method according to claim 21, wherein said matrix of pixels are divided into a plurality of display elements each adapted for a gradational display and comprising a plurality of pixels formed at intersections of a plurality of scanning lines including at least one of the first-type scanning lines and at least one of the second-type scanning lines with a plurality of data lines including at least one of the first-type data lines and at least one of the second-type data lines, and each display element is driven by selectively turning on and off the plurality of pixels therein so as to alleviate a vertical shift of gravity center of brightness at different gradation levels.

23. A display apparatus, comprising:

a display device of the type comprising a plurality of scanning lines and a plurality of data lines arranged so as to form a matrix of pixels each formed at an intersection of the scanning lines and the data lines, said pixels comprising at least two types of pixels having mutually different areas inclusive of larger pixels and smaller pixels, said plurality of scanning lines including first-type scanning lines having thereon the larger pixels and second-type scanning lines having thereon the smaller pixels, said plurality of data lines including first-type data lines and second-type data lines providing pixels of mutually different areas on a common scanning line; and drive means for driving the display device according to a driving method of claim 21.

24. A display apparatus according to claim 23, wherein said matrix of pixels is divided into a plurality of display elements each adapted for a gradational display and comprising a plurality of pixels formed at intersections of a plurality of scanning lines including at least one of the first-type scanning lines and at least one of the second-type scanning lines with a plurality of data lines including at least one of the first-type data lines and at least one of the second-type data lines, and each display element is driven by selectively turning on and off the plurality of pixels thereon so as to alleviate a vertical shift of gravity center of brightness at different gradation levels.

* * * * *

UNITED STATES PATENT AND TRADEMARK OFFICE
CERTIFICATE OF CORRECTION

PATENT NO.   : 5,963,190
DATED        : October 5, 1999
INVENTOR(S)  : AKIRA TSUBOYAMA, ET AL.

It is certified that error appears in the above-identified patent and that said Letters Patent is hereby corrected as shown below:

COLUMN 1

Line 51, "descried" should read --described--.

COLUMN 2

Line 25, "2. White" should read --2, white--.

COLUMN 3

Line 61, "areal-size" should read --areal size--.

COLUMN 4

Line 50, "$C1a \rightarrow C1b \rightarrow C2a \rightarrow C2b \rightarrow C3a \rightarrow C3b \rightarrow C4a \rightarrow C4b \rightarrow C5a \rightarrow C5b \rightarrow C480a$." should read --$C1a \rightarrow C1b \rightarrow C2a \rightarrow C2b \rightarrow C3a \rightarrow C3b \rightarrow C4a \rightarrow C4b \rightarrow C5a \rightarrow C5b \rightarrow ... \rightarrow C480a \rightarrow C480b$,--;

Line 64, "areal-size" should read --areal size--.

COLUMN 5

Line 59, "a" should read -as--.

COLUMN 6

Line 6, "scrawling." should read --scrolling.--;

UNITED STATES PATENT AND TRADEMARK OFFICE
CERTIFICATE OF CORRECTION

PATENT NO.    : 5,963,190
DATED         : October 5, 1999
INVENTOR(S)   : AKIRA TSUBOYAMA, ET AL.

Page 2 of 2

It is certified that error appears in the above-identified patent and that said Letters Patent is hereby corrected as shown below:

COLUMN 7

Line 38, "C399B," should read --C399b,--.

COLUMN 10

Line 16, "enter" should read --center--.

Signed and Sealed this

Thirtieth Day of January, 2001

Attest:

Q. TODD DICKINSON

Attesting Officer

Director of Patents and Trademarks